United States Patent [19]

Grube et al.

[11] Patent Number: 5,555,192
[45] Date of Patent: Sep. 10, 1996

[54] DETECTION OF DUPLICATE IDENTIFICATION CODES IN COMMUNICATION UNITS

[75] Inventors: Gary W. Grube, Barrington, Ill.; Timothy W. Markison, Austin, Tex.

[73] Assignee: Motorola, Inc., Schaumburg, Ill.

[21] Appl. No.: 389,613

[22] Filed: Feb. 16, 1995

Related U.S. Application Data

[63] Continuation-in-part of Ser. No. 23,512, Feb. 26, 1993, abandoned.
[51] Int. Cl.$^6$ .............................. H04Q 3/02; G06K 15/00
[52] U.S. Cl. ..................... 364/514 R; 379/59; 455/33.1; 455/67.1; 340/825.15
[58] Field of Search ......................... 340/825.15; 379/59, 379/60; 455/54.1, 56.1, 33.1, 67.1; 364/514

[56] References Cited

PUBLICATIONS

Fenner, P. R., "Mobil Address Management and Billing for Personal Communication"; IEEE 1st International Conf. ICUPC '92 Proceeding (Cat No. 92TH0434–1) P. 09–06/1–5.

Primary Examiner—Emanuel T. Voeltz
Assistant Examiner—Kamini Shah
Attorney, Agent, or Firm—Christopher P. Moreno

[57] ABSTRACT

A monitoring computer (115) monitors the communications occurring within at least one communication system for a unique communication unit identification (ID) code associated with a communication unit (105, 110). In a first embodiment, for each occurrence of the unit ID code, the monitoring computer determines a location of the communication unit affiliated with that unit ID code. When two or more instances of the unit ID code occur within a predetermined period of time at locations separated by more than a predetermined distance, the unit ID code is identified as a potentially duplicated unit ID code. In a second embodiment, a counter is incremented for each occurence of the unit ID code. If the counter exceeds a predetermined number within a predetermined period of time, the unit ID code is identified as a potentially duplicated unit ID code.

10 Claims, 4 Drawing Sheets

| UNIT ID CODE 201 | FEATURES 202 | APPLICATIONS AND SERIAL NUMBERS 203 | LOCATION AND TIME AND COUNT 204 | GROUP ID CODE 205 |
|---|---|---|---|---|
| 1 | 3,5,7 | 10-3763 | 22/18:10/3 | 201 |
| 2 | 1,3,8 | 9-4509756 | 15/18:20/5 | 201 |
| 3 | 3,4,5 | 49-46383 | 6/14:00/2 | 300 |
| ⋮ | | | | |

DETECTION OF DUPLICATE IDENTIFICATION CODES IN COMMUNICATION UNITS

CROSS REFERENCE TO RELATED APPLICATION

This is a continuation-in-part of application Ser. No. 08/023,512 filed Feb. 26, 1993, now abandoned, by Gary W. Grube et al., the same inventive entity as in the present application, which prior application is assigned to Motorola, Inc., the same assignee as in the present application.

FIELD OF THE INVENTION

The present invention relates generally to communication systems and, in particular, to the detection of duplicate communication unit identification codes.

BACKGROUND OF THE INVENTION

The basic operation and structure of land mobile radio communication systems and cellular radio/telephone communication systems (communication systems) are known. Communication systems typically comprise a plurality of communication units (vehicle mounted or portable radios in a land mobile system and radio/telephones in a cellular system), a predetermined number of repeaters, which are located throughout a geographic region, that transceive information via communication channels, and a controlling entity. A controlling entity may either be a centralized call processing controller or it may be a network of distributed controllers working together to establish communication paths for the communication units.

In the course of normal operations, communication units can often utilize various communication services or features to communicate with one another. For instance, a communication unit may be capable of group dispatch, private call, secure voice, telephone interconnect and other services (as found in a Motorola SmartNet™ or Privacy Plus™ communication system), or a subset of such services. The provision of multiple communication services typically add value to those communication units capable of such services. This added value is often reflected by communication system manufacturers as an added premium to the cost of the communication units. For instance, a customer may purchase a Privacy Plus™ system and pay an extra fee to allow a certain group of mobiles to have additional telephone interconnect capabilities. Quite often, the distinguishing characteristics between a "regular" mobile and an "enhanced" mobile are the software applications operating within each communication unit.

Typically, there are two techniques which allow the selective utilization of software applications by a communication unit. In the first technique, each communication unit is programmed at the manufacturer's factory with software applications stored in a non-volatile memory such as PROM (programmable read-only memory). Regular and enhanced communication units are distinguished by codeplug bits which enable various software applications. Thus, the non-volatile memories of both a regular and enhanced communication unit contain the same software, but those applications necessary for additional types of communication are enabled (via the codeplug bits) only in enhanced communication units. Alternatively, an external programming device may be used to enable software applications. For instance, many communication products made by Motorola utilize Radio Service Software (RSS), which operates on a typical personal computer, to enable various software features.

A second technique for selective software utilization is to add software applications via an external programming device similar to RSS. For this technique, individual communication units contain a re-programmable non-volatile memory such as EEPROM (electrically erasable programmable read-only memory) for storing the software applications. Thus, the memory of a regular communication unit will contain only those software applications necessary for basic operation whereas the memory of an enhanced communication unit will contain software applications which allow other types of communication in addition to the basic operation. Unfortunately, neither of the two techniques discussed above are able to fully prevent unauthorized use and duplication of software applications and communication unit identification codes (unit ID codes).

It is possible for a user to copy the non-volatile memory of an enhanced communication unit and place the replicated software applications into the non-volatile memory of a regular unit, thereby creating a substantially identical enhanced unit without paying an additional fee. Such tactics are often employed in systems where a user is charged according to the number of unit ID codes used in the system. By duplicating a communication unit's memory, and hence its ID code, additional communication units can be provided. Alternatively, anyone in possession of the appropriate external programming device can illicitly enable or add unauthorized software applications. Although many communication systems possess means for denying access to communication units that are incorrectly programmed, some system operators do not enable these means, thus allowing unauthorized use. The unauthorized use and duplication of software applications and unit ID codes not only cheats manufacturers of their entitled fees, they also overburden critically scarce communication resources and interfere with the authorized communications of other communication units.

Further exacerbating the use of unauthorized software applications and/or duplicated unit ID codes is the difficulty of its detection. Often, the only way to detect unauthorized use and duplication is to individually examine each communication unit within a system. Obviously, this is a costly proposition for systems comprising thousands of communication units. Therefore a need exists for a method which allows the detection of unauthorized use and duplication of software applications and unit ID codes in communication units.

DESCRIPTION OF A PREFERRED EMBODIMENT

Generally, the present invention provides detection of unauthorized use and duplication of unit ID codes by communication units in a communication system. This is accomplished by associating a monitoring computer with the communication system to monitor communications within the communication system. While monitoring communications, in a first embodiment, the monitoring computer detects various occurrences of unit ID codes. For each occurrence of a unit ID code, the monitoring computer determines a location of a communication unit affiliated with that unit ID code. If, within a predetermined period of time, there occur two or more instances of a unit ID code at locations separated by more than a predetermined distance, the unit ID code is identified as a potentially duplicated unit ID code.

In a second embodiment, the monitoring computer increments a counter for each occurence of the unit ID code. If the counter exceeds a predetermined number within a predetermined period of time, the unit ID code is identified as a potentially duplicated unit ID code. As described by each of the above embodiments, the present invention provides a method which allows the detection of unauthorized use and duplication of software applications and unit ID codes in communication units.

Figure 1:
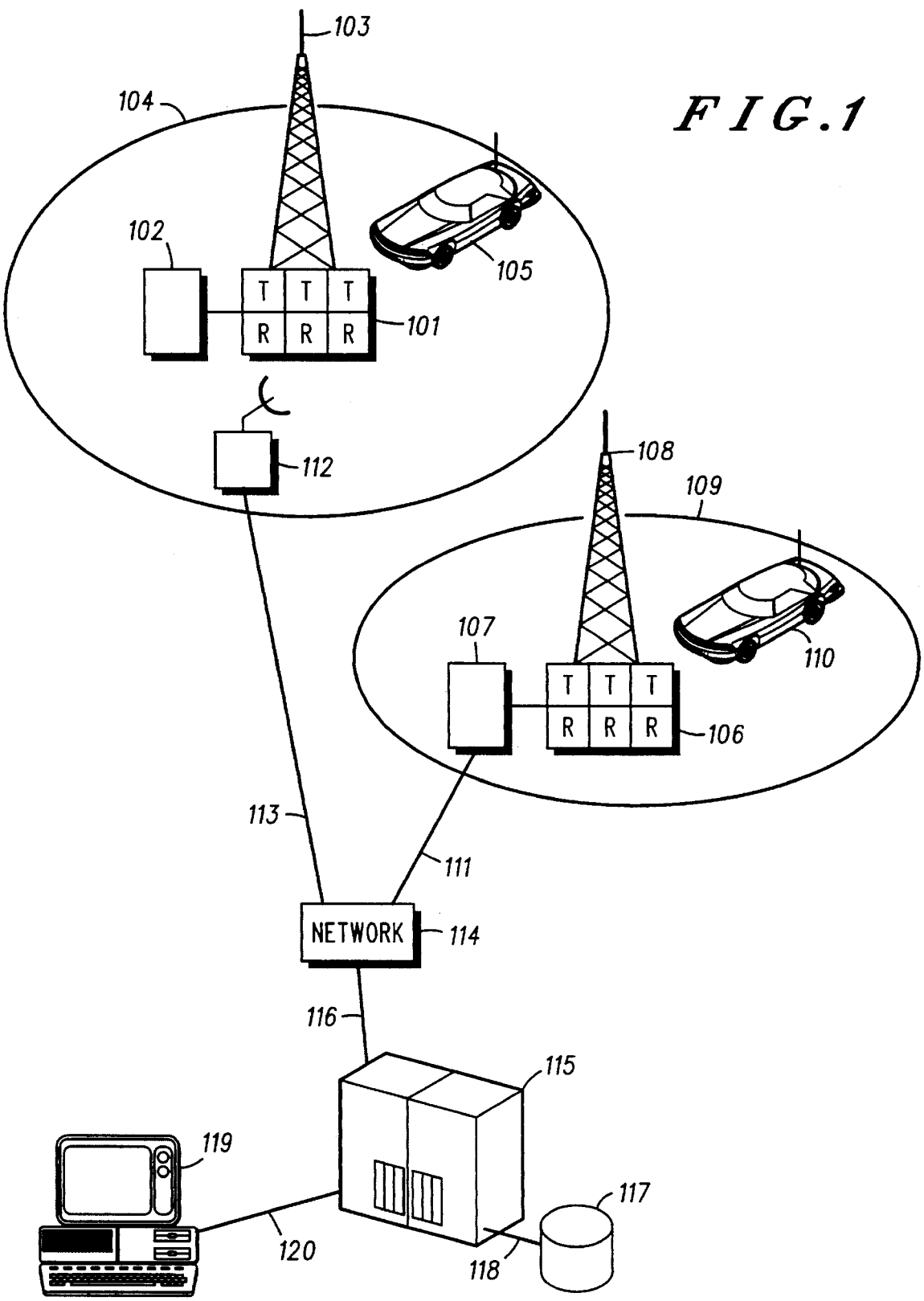
FIG. 1 illustrates a multiple communication systems and a monitoring computer in accordance with the present invention.

The present invention can be more fully described with reference to FIGS. 1–4. FIG.1 illustrates multiple communication systems operably connected to a monitoring system. The communication systems comprise a plurality of communication units 105, 110, a predetermined number of repeaters 101, 106 operably connected to fixed antenna systems 103, 108 providing respective coverage areas 104, 109, and a call processing controller 102, 107 to establish communications between two or more communication units. A communication system may be interconnected to a network 114 by a direct link 111 to the call processing controller 107. Alternatively, a communication system may be connected by a link 113 to the network 114 by way of an over-the-air radio modem 112, which in turn communicates with the call processing controller 102 over at least one of the channels in the group of site repeaters 101.

The monitoring system comprises an RF monitor, a monitoring computer 115, a database 117 and at least one computer terminal 119. The RF monitor may be the over-the-air radio modem 112 and associated link 113, or it may the link 111 that couples the call processor 107 to the network. As shown, the monitoring system is coupled to the network via link 116, while link 120 couples the terminal 119 to the computer 115 and link 118 couples the database 117 to the computer 115.

The monitoring computer 115, database 117, and computer terminal 119 may comprise a commercially available mid-range computing device, such as an IBM AS400 and is capable of performing the methods described herein. The link 116 provides the monitoring computer 115 with control information that is embedded in the network 114 protocol. Relevant control information, i.e., location information in the form of coordinates and/or site location, is extracted by the monitoring computer 115 from the network 114 protocol for processing. The manner in which the monitoring computer 115 is coupled to the network 114 as well as the manner in which control information is routed to the monitoring computer 115 is dependant upon the actual computing device used to implement the monitoring computer 115 and the network 114 protocol.

Figures 2, 3:
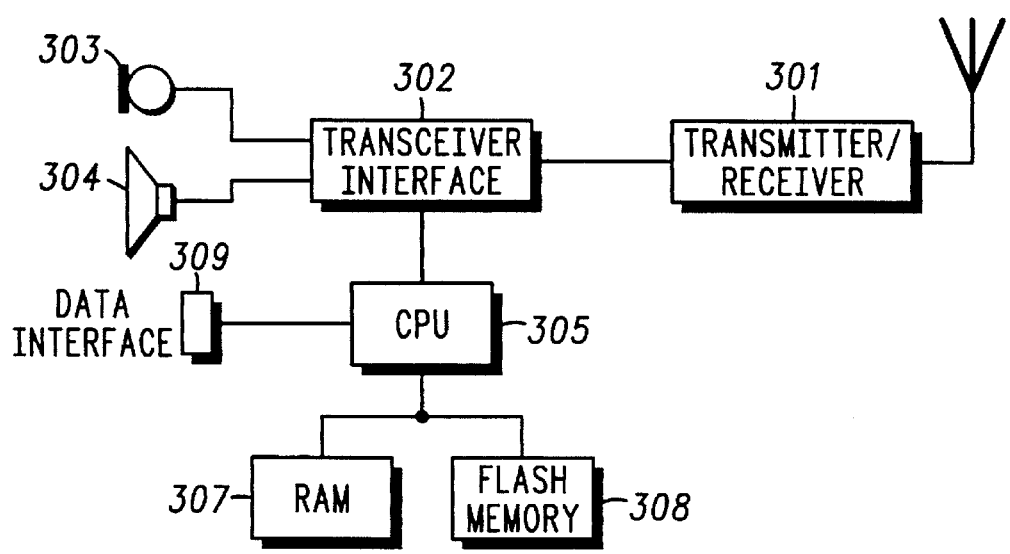
FIG. 2 illustrates a database format which may be used by the monitoring computer.
FIG. 3 illustrates a block diagram of a communication unit.

FIG. 2 illustrates database tables which contain, for each communication unit to be monitored, software application parameters that are stored in the database 117. In the first table, a unit ID code field 201 represents the identities of the communication units. Communication units are normally assigned a unique identity code to differentiate them from other communication units. Associated with each unit ID code are several other fields used to determine valid software parameters. The features field 202 lists which of the possible embedded service features this unit is allowed to use regardless of how the call processing controller 102, 107 actually responds to resource requests. For example, the communication unit identified with the unit ID code of 3 is allowed to use features 3, 4, and 5.

An applications and serial numbers field 203 lists which additional software applications each unit ID code is authorized to use and have possession of. Each additional software application shown in the applications and serial numbers field 203 is uniquely identified by an authorized serial number. Following the current example, communication unit 3 is also allowed to use another software application, uniquely identified by the serial number 49-46383.

A location, time, and count field 204 is used to temporarily store source location information and time-stamps, or time indications, of system access by the communication units. In a preferred embodiment, the source location information comprises an identification of the particular site the communication unit is currently operating in; methods for determining identification of the site are known in the art. Alternatively, the source location information may comprise geographic coordinates (i.e., longitude and latitude) determined by a global positioning satellite (GPS) receiver, as known in the art.

The count entry within the location, time, and count field 204 is used by the monitoring computer 115 to track the number of accesses to the network 114 by each communication unit. Again using the current example, it can be seen that communication unit 3 last accessed the system, for the second time, at 1400 hours (2 PM standard time) while located within site 6.

From the structure of the location, time, and count field 204, it is possible to determine if a unit ID code has been copied. One possible method is to compare source location information relative to the time indications for separate detections of a unit ID code. Using the current example, if communication unit 3 again accesses the system at 1401 hours (one minute after the last detected access) while located within site 4, and it is known that sites 4 and 6 are geographically distant from each other, 20 miles for example, it can be assumed that it was impossible for such system access to have been made by the same communication unit. Therefore, unit ID code 3 could be identified as a potentially duplicated unit ID code.

Another technique for using the location, time, and count field 204 for detecting duplicate unit ID codes is to count the number of system accesses associated with a unit ID code within a predetermined period of time. The length of the predetermined period of time is dependant upon several factors including the average message traffic load within the system and the number of communication units in the system. A typical value could be 1 day. Thus, if the count field associated with a unit ID code reaches 3000 within a 24 hour period, it can be assumed that such heavy use is the result of multiple communication units using duplicated unit ID codes. Finally, a group ID code field 205 associates an individual unit ID code to a group. In the current example, communication unit 3 is affiliated with the group identified by the group ID number 300.

FIG. 3 illustrates a block diagram of a communication unit used in the present invention. All of the individual elements are readily known in the art, thus no further discussion will be presented regarding their operation other than to further illustrate the present invention.

A radio transceiver 301 is employed to link a communication system to the logic and operator of the communication unit. Furthermore, the radio transceiver 301 may also include a GPS receiver (not shown), as discussed above. Depending on the application or type of communication, different channel activity will take place on the radio link. The communication channels may be TDM (time-division multiplexed slots, carrier frequencies, a pair of carrier frequencies or other radio frequency (RF) transmission medium. A frequency or time portion of one or more of the communication channels may be established for call control purposes to allow the communication unit or processing device logic to communicate with the call processing controller to request and receive system resources.

A transceiver interface 302 operably couples the transceiver 301 to the internal logic and audio input/output devices such as a microphone 303 and a speaker 304. These elements may be used in routine voice communications between users of two or more communication units. In addition to providing modulation/demodulation functions for the microphone 303 and speaker 304, the transceiver interface 302 also couples the communication unit CPU 305 and logic to the transceiver 301. The CPU 305 may comprise a Motorola 68HC11 microprocessor. The CPU 305 provides control of the communication unit and also provides direct communication to other external computing devices by way of a data interface 309. The data interface 309 may comprise an EIA standard port such as RS-232, RS-422, or another type. The data interface 309 may communicate data communications between users of two or more communication units and may be used to load new software applications into the communication units for use at a later time. New software applications are stored in non-volatile flash memory 308 which is operably coupled with the CPU 305 through a data and address bus 306. Temporary operating variables may be stored and retrieved by the CPU 305 in RAM 307.

Figure 4:
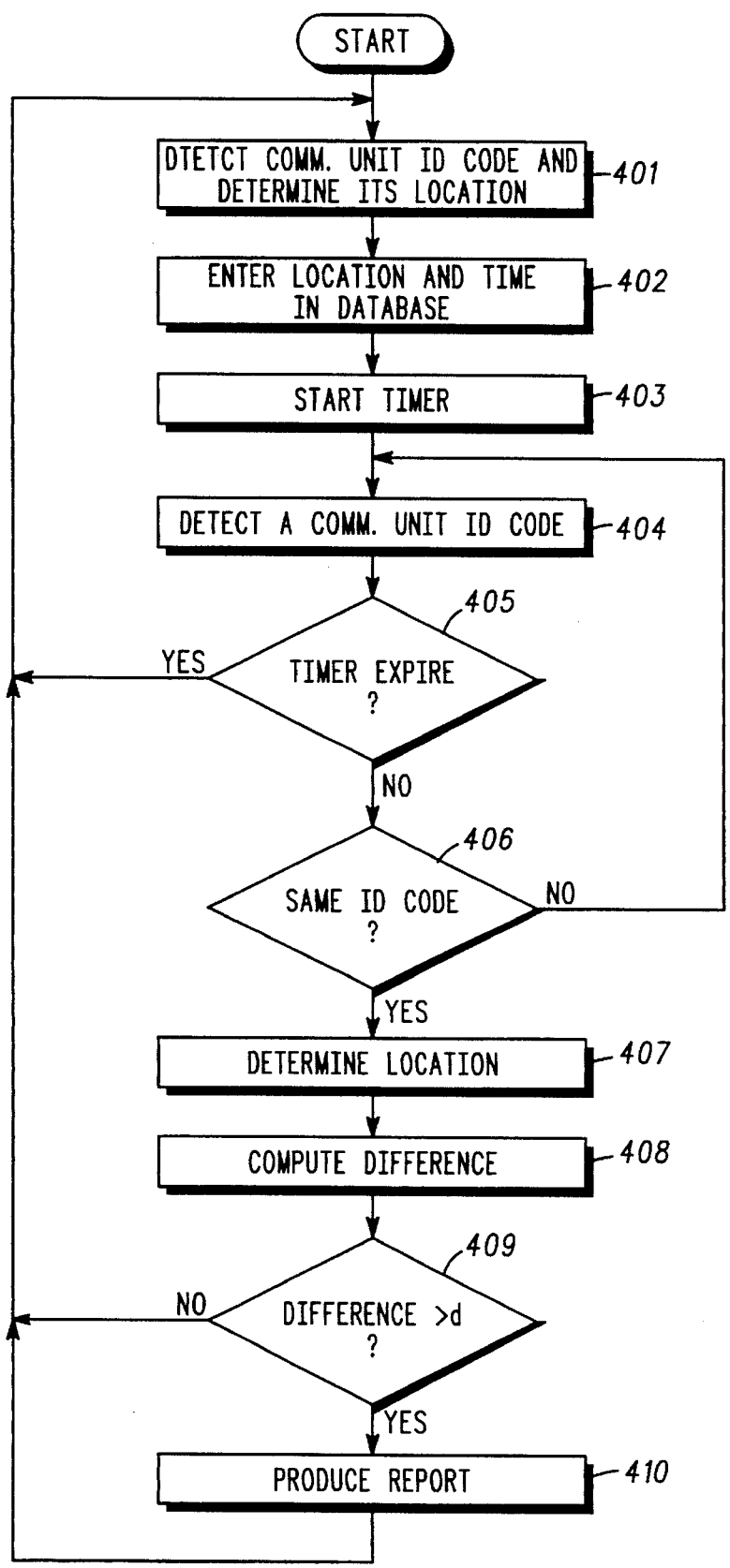
FIG. 4 illustrates a flow chart of a first embodiment of the present invention.

FIG. 4 illustrates a flow chart of a first embodiment of the present invention. Channel activity is monitored at each of the communication systems. This channel activity is a result of communications of at least one communication unit served by the communication systems. The communications may contain voice, text, images, multi-media, or other information. The communication unit may contain software applications for various types of communications or features such as group dispatch, private call, telephone interconnect, data call, and others. The channel activity routinely contains call establishment and identification information which is communicated to the monitoring computer 115 by a direct link 111 or by a radio link 113. Thus, at step 401, a particular unit ID code is detected in the channel activity and a source location associated with the detected unit ID code is determined. Methods for detecting a unit ID code from channel activity are well known in the art. In the first embodiment, the source location information is included in the channel activity in the form of embedded site location information or geographic coordinates.

At step 402, the database 117 associated with the monitoring computer 115 is accessed to enter the location and time of the communication associated with the detected unit ID code. To this end, the table of FIG. 2 is included in the database 117. Simultaneously, at step 403, the monitoring computer 115 starts a software timer to measure the passage of time since the initial detection of the given unit ID code.

Similar to step 401, the monitoring computer 115 continues to monitor transmissions at step 404 to detect a unit ID code.

When a unit ID code is detected at step 404, the monitoring computer 115 determines if the software timer has expired at step 405, i.e., if a predetermined period of time has elapsed since starting the timer. If the timer has expired, the process of detecting a unit ID code is restarted at step 401. The length of the predetermined period of time is dependent upon the configuration of the communication systems involved as well as the characteristics of the communication units. For example, if the communication systems are spread over a relatively large geographic region, with only a few communication units accessing the system at any one time, the predetermined period of time could be an hour. On the other hand, if the communication systems cover a small area with a high density of communication units, the predetermined period of time could be on the order of one or two minutes.

If the predetermined period of time has not elapsed, the unit ID detected at step 404 is compared at step 406 with the unit ID stored in the database 117. If the two unit IDs do not match, the monitoring computer 115 continues at step 404 to detect yet another unit ID code.

If the unit IDs do match, the source location for the unit ID code detected at step 404 is determined at step 407. This is done using the same techniques as described at step 401. Those of ordinary skill in the art will recognize that the location determination of step 407 could be performed at the same time, or shortly after, the step of detecting a unit ID of step 404. For the purposes of clarity, it is shown after steps 405 and 406.

At step 408, a difference (i.e., a geographical distance) between the two source locations, determined at steps 401 and 407, is computed. The method used to compute the difference depends on the type of source location information provided. For example, if geographic coordinates are provided, well-known algortithms for computing a Cartesian distance are used. Alternatively, if site locations are provided, site configuration information stored in the database 117 is used. The site configuration information can comprises known distances between various sites and/or the boundaries of the sites in terms of geographic coordinates.

At step 409, the difference computed at step 408 is compared to a predetermined distance, d. The predetermined distance is based on the physical impracticality of a single communication unit being able travel that distance within the predetermined period of time. For example, if the predetermined period of time is one hour, the predetemined distance can be 100 miles. Likewise, if the predetemined period of time is one minute, the predetermined distance can be two miles. Thus, if the difference calculated at step 408 is less than or equal to the predetermined distance, it is assumed that the unit ID codes detected at steps 401 and 404 were transmitted by the same physical communication unit, and the process is restarted at step 401.

If the difference is greater than the predetermined distance, a report is generated at step 410 by the monitoring computer 115. The report indicates that the detected unit ID code is being used in an unauthorized fashion by at least two communication units; it is impractical that one communication unit could have travelled a distance greater than the predetermined distance within the predetermined period of time. Upon completion of the report, or while the report is being compiled, further channel activity monitoring continues at step 401. In this manner, the existence of communication units using a duplicated unit ID code is determined.

Figure 5:
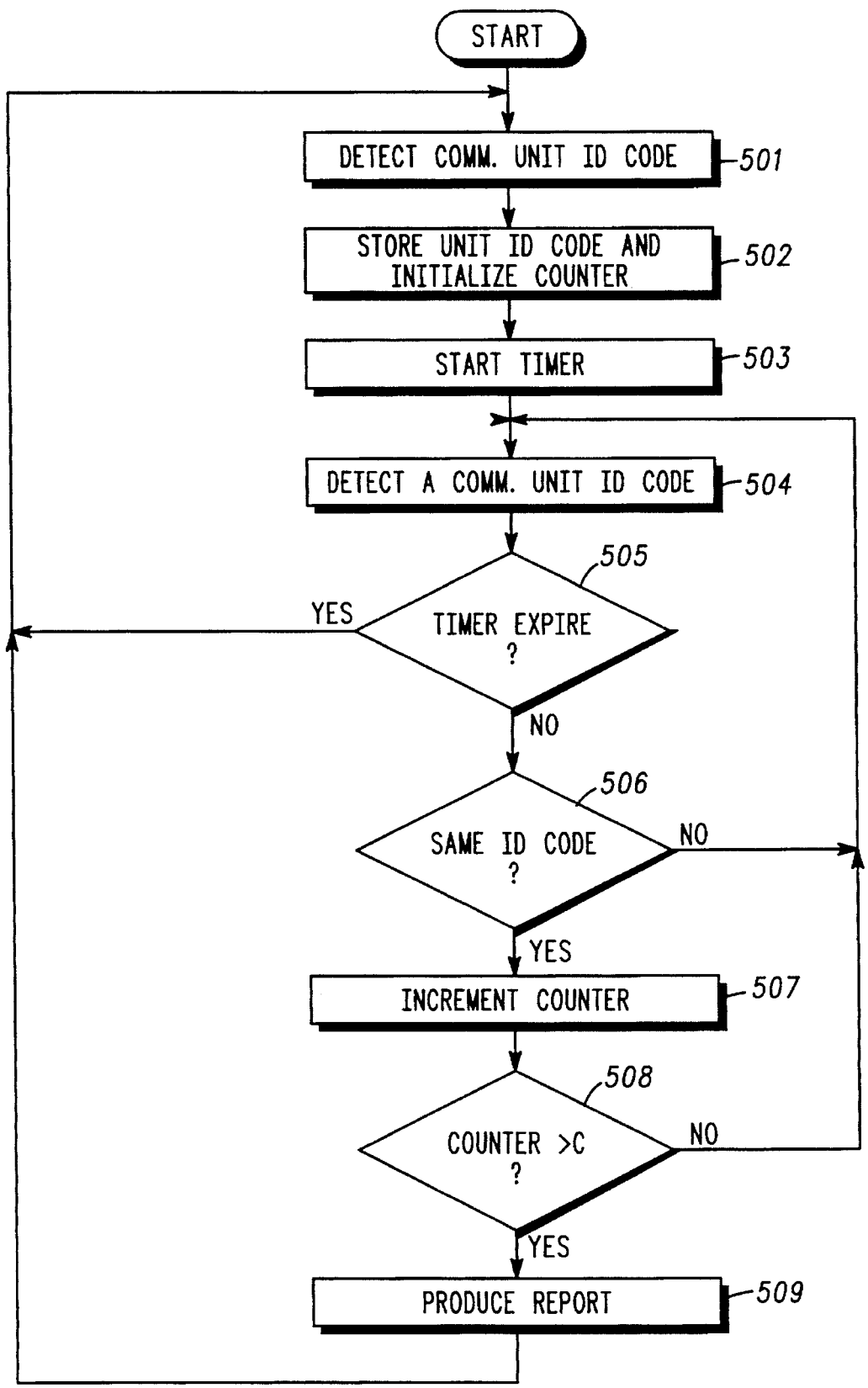
FIG. 5 illustrates a flow chart of a second embodiment of the present invention.

FIG. 5 illustrates a flow chart of a second embodiment of the present invention. As before, channel activity is monitored at each of the communication systems. At step 501, a particular unit ID code is detected in the channel activity.

At step 502, the database 117 is accessed to store the unit ID code detected in step 501, and to initialize a counter associated with the detected unit ID code, as shown shown in the location, time, and count field 204 of FIG. 2. Simultaneously, at step 503, the monitoring computer 115 starts a software timer to measure the passage of time since the initial detection of the given ID code. Similar to step 501, the monitoring computer 115 continues to monitor transmissions at step 504 to detect a unit ID code.

When a unit ID code is detected at step 504, the monitoring computer 115 determines if the software timer has expired at step 505, i.e., if a predetermined period of time has elapsed since starting the timer. If the timer has expired, the process of detecting a unit ID code is restarted at step 501. As discussed above, the length of the predetermined period of time is dependent upon the configuration of the communication systems involved as well as the characteristics of the communication units.

If the predetermined period of time has not elapsed, the unit ID detected at step 504 is compared at step 506 with the unit ID stored to the database 117. If the two unit IDs do not match, the monitoring computer 115 continues at step 404 to detect yet another unit ID code.

If the unit IDs do match, the counter associated with the unit ID code is incremented at step 507. At step 508, the counter value is compared with a predetermined number, C. The predetermined number is based on the low probability that a single communication unit would access the system more times within the predetermined period of time. For example, if the predetermined period of time is set to one minute, the predetermined number, C, could be set to 10 for a system having a high rate of communication traffic. Thus, if the counter value is less than or equal to the predetermined value C, it cannot yet be assumed that the unit ID codes detected at steps 401 and 404 were transmitted by the same physical communication unit, and the process continues at step 504.

If the the counter value is greater than the predetermined value, a report is generated at step 509 by the monitoring computer 115. The report indicates that the detected unit ID code is being used in an unauthorized fashion by at least two communication units, i.e. it is impractical that one unit could have accessed the system so many times within the predetermined period of time. Upon completion of the report, or while the report is being compiled, further channel activity monitoring continues at step 501.

The present invention allows a monitoring computer to monitor channel activity of multiple communication systems and to compare a detected communication unit ID code with a previously detected communication unit ID code stored in a database. A report can be issued in the event that the unit ID codes are used in more than one communication unit. Such use is determined when the unit ID code is used more than once within a predetermined period of time and more than a predetermined distance apart. Alternatively, if the unit ID code is used more than a predetermined number of times within the predetermined period of time, a report is generated. By monitoring communications in this manner, the unauthorized duplication of unit ID codes can be detected without physically investigating each communication unit.

We claim:

1. In a radio communication system, a method for detecting unauthorized duplication of a first RF communication unit identity, the method comprising the steps of:
 a) operably receiving, by a monitoring computer, a first RF transmission, wherein the first RF transmission includes the first RF communication unit identity;
 b) when the first RF transmission is received, determining, by the monitoring computer, source location of the first RF transmission;
 c) storing, by the monitoring computer in a data base, the source location of the first RF transmission and the first RF communication unit identity;
 d) within a predetermined period of time after receiving the first RF transmission, operably receiving, by the monitoring computer, a second RF transmission, wherein the second RF transmission includes a second RF communication unit identity;
 e) when the second RF transmission is received, determining by the monitoring computer, source location of the second RF transmission;
 f) comparing, by the monitoring computer, the first RF communication unit identity with the second RF communication unit identity;
 g) when the first RF communication unit identity substantially matches the second RF communication unit identity, determining, by the monitoring computer, a difference between the source location of the first RF transmission and the source location of the second RF transmission; and
 h) when the difference exceeds a predetermined distance, identifying, by the monitoring computer, the unauthorized duplication of the first RF communication unit identity.

2. The method of claim 1, step (b) further comprising the step of determining source location of the first RF transmission based on site location information included in the first RF transmission.

3. The method of claim 2, step (e) further comprising the step of determining source location of the second RF transmission based on site location information included in the second RF transmission.

4. The method of claim 1, step (b) further comprising the step of determining source location of the first RF transmission based on geographic coordinates included in the first RF transmission.

5. The method of claim 2, step (e) further comprising the step of determining source location of the second RF transmission based on geographic coordinates included in the second RF transmission.

6. The method of claim 1, further comprising the step of:
 i) generating, by the monitoring computer, a report indicating that the first RF communication unit identity was duplicated.

7. A monitoring system for monitoring and detecting unauthorized duplication of unique identification codes of communication units, the monitoring system comprises:
 an RF monitor that monitors RF communication resource activity in at least one communication system;
 a monitoring computer, operably coupled to the RF monitor, wherein the monitoring computer detects when an RF communication unit is utilizing a unique communication unit identity and detects location of the RF communication unit utilizing the unique communication unit identity;

memory, operably coupled to the monitoring computer, wherein the memory stores location of the RF communication unit utilizing the unique communication identity; and wherein the monitoring computer compares, during a predetermined period of time, the location of the RF communication unit utilizing the unique communication unit identity with at least one previously stored location and identifies when the location of the RF communication unit utilizing the unique communication unit identity is greater than a predetermined distance from the at least one previously stored location and indicates that the unique communication unit identity has been duplicated.

8. The monitoring system of claim 7, the computer further comprising additional circuitry to generate a report indicating that the unique communication unit identity has been duplicated.

9. A method for detecting unauthorized duplication of communication unit identity, the method comprises the steps of:

a) detecting, by a monitoring computer in at least one communication system, the communication unit identity to produce a first detected communication unit identity;

b) when the first detected communication unit identity is detected, setting, by the monitoring computer, a counter for the communication unit identity;

c) continually detecting, within a predetermined period of time by the monitoring computer, the communication unit identity again to produce a plurality of subsequently detected communication unit identities;

d) for each of the plurality of subsequently detected communication unit identities, incrementing, by the monitoring computer, the counter for the communication unit identity; and e) when the counter for the communication unit identity exceeds a predetermined value, identifying, by the monitoring computer, that the communication unit identity has been duplicated.

10. The method of claim 9 further comprises generating, by the monitoring computer, a report indicating that the communication unit identity has been duplicated.

* * * * *